United States Patent [19]

Kruger

[11] Patent Number: 5,126,209
[45] Date of Patent: Jun. 30, 1992

[54] TRANSPARENT POLYURETHANE LAYER RESISTANT TO FOGGING, METHOD OF MANUFACTURE AND GLAZING PROVIDED WITH SAID LAYER

[75] Inventor: Albert A. Kruger, Brooklyn, N.Y.

[73] Assignee: Saint-Gobain Vitrage, Courbevoie, France

[21] Appl. No.: 151,492

[22] Filed: Feb. 2, 1988

[30] Foreign Application Priority Data

Feb. 2, 1987 [FR] France .................. 87 01184

[51] Int. Cl.⁵ .............. B32B 27/16; B32B 27/40; B05D 3/06; B05D 5/06
[52] U.S. Cl. .............. 428/425.6; 427/44; 427/53.1; 427/54.1; 427/163; 428/423.1; 428/424.2; 522/85; 522/144; 522/911; 525/440; 525/454
[58] Field of Search .......... 523/169; 522/144; 427/44, 53.1, 54.1; 428/423.1, 424.2; 525/440, 454

[56] References Cited

U.S. PATENT DOCUMENTS

| | | | |
|---|---|---|---|
| 3,389,098 | 6/1968 | Gladstone | 522/124 |
| 3,488,268 | 1/1970 | Tanner | 522/48 |
| 3,515,579 | 6/1970 | Shepherd | 523/169 |
| 3,935,367 | 1/1976 | Merrill | 428/336 |
| 4,018,939 | 4/1977 | Merrill | 427/54.1 |
| 4,099,859 | 7/1978 | Merrill | 522/144 |
| 4,377,010 | 3/1983 | Fydelor | 428/515 |
| 4,421,782 | 12/1983 | Bolgiano | 522/96 |
| 4,632,877 | 12/1986 | Watanabe | 428/409 |

FOREIGN PATENT DOCUMENTS 77227 4/1983 European Pat. Off. .

Primary Examiner—Marion E. McCamish
Assistant Examiner—Arthur H. Koeckert
Attorney, Agent, or Firm—Oblon, Spivak, McClelland, Maier & Neustadt

[57] ABSTRACT

A transparent polyurethane layer which is resistant to fogging. The layer contains monomers and/or oligomers of acrylic acid or of salts of said acid grafted radiochemically to the surface of said layer. The layer is used as a coating layer for laminated glazings.

12 Claims, No Drawings

TRANSPARENT POLYURETHANE LAYER RESISTANT TO FOGGING, METHOD OF MANUFACTURE AND GLAZING PROVIDED WITH SAID LAYER

BACKGROUND OF THE INVENTION

1. Field of the Invention

The invention relates to a transparent layer of polyurethane, as well as to safety glazings covered with such a layer, used in particularly in means to transport and in building, and it deals more particularly with the improvement of the behavior of said glazings when faced with condensation and the formation of fog.

2. Background of the Prior Art

Safety glazings are used more and more in large sizes on transport vehicles or in buildings and in small sizes in eye-glasses, masks, lenses, etc., which safety glazings are of the type comprising a monolithic or laminated support, in glass or plastic, coated through the intermediary of an adhesive layer possibly having energy-absorbing properties, with a transparent plastic layer which is anti-lacerating, that is, should the glazing break, this layer covers the sharp edges of the glass fragments and prevents possible cuts due to said sharp edges; in addition, this layer is auto-cicatrizable, that is, it is composed of a plastic from which localized dents or surface abrasions disappear spontaneously after a short period of time.

Such glazings are described for example in French Patent Publications Nos. 2,187,719, 2,316,913, 2,320,563, 2,398,606 and European Patent Publication Nos. 0,132,198 and 0,131,523. They may, for example, be a laminated glazing comprising two sheets of glass connected by an interposed sheet of plastic, for example polyvinylbutyral, and covered with a sheet of transparent plastic whose surface in contact with the support is essentially thermoplastic, while its external surface is formed essentially of a heat-hardenable polyurethane, or even of a laminated glazing comprising a sheet of glass and a sheet of plastic formed of a polyurethane layer having energy-absorbing properties and an external layer of heat-hardenable polyurethane having auto-cicatrization properties.

The windshields of transport vehicles, in particular, can be subjected to sudden variations in temperature and humidity. As soon as their surface temperature goes below the dewpoint of the surrounding air, there is water condensation, which can bother the driver.

Moreover, the effects of the phenomenon vary considerably depending on the type of transparent surface being considered: on bare glass, the drops of water spread much more easily than on an organic film. By simple wiping of bare glass, a relatively regular film of water is formed which is transparent from an optical point of view and whose presence considerably attenuates the effects of condensation. In general, with a plastic film, and in a manner which varies considerably depending on the nature of the film, the drops of water from condensation can be much more prominent and dense; simple wiping removes the drops, but no film is formed and fogging is renewed more rapidly.

Various solutions have already been proposed to improve the behavior vis-a-vis the vapor of transparent surfaces in glass or plastic.

In general, it is known to deposit on the transparent surface products of the hydrophilic type which are capable of mixing with water when there is a risk of vapor by forming a fine and homogeneous film. For example, the deposit of a layer of glycol or glycerin compounds considerably improves the properties of the treated surfaces. However, these water-soluble compounds are removed with the first wiping and must therefore be continually renewed, which is restrictive and costly.

Also known, for example from German Patent No. 1,928,409, are methods for treatment of transparent surfaces so as to provide them with good resistance to fogging, which consist of depositing polymer layers of the polyacrylate and/or polymethacrylate type with hydroxyl groups. These very hydrophilic layers absorb water without being dissolved therein. Due to the absorption of water, these films swell to a greater or lesser degree, soften and become more sensitive to abrasion which, in the long term, is harmful to the transparency of the treated surface.

The perfection of anti-fogging treatments by the deposit of anti-fog surface layers has therefore always confronted contradictory requirements: an improved anti-fogging action decreases the abrasion resistance, while increased abrasion resistance corresponds to a decrease in the anti-fogging effect. In effect, it has been sought to reinforce the resistance of the layers by introducing a hardener into their compositions. However, since said hardener generally reacts by polycondensation with the constituent polymers of the layer, it renders unavailable the hydroxyl type groups which provide the layer with the hydrophilic properties which promote the anti-fogging action.

In the case of glazings coated with an anti-lacerating and auto-cicatrizable plastic layer, such as are described for example in the above-cited French and European patent publications, the problem of fogging must be resolved by a treatment of the glazing which in no way alters the excellent anti-laceration and auto-cicatrization properties which are specific to them by means of the presence of the transparent polyurethane coating layer: the treatment must be effective over a very long period of time; it must not modify the nature of the polyurethane layer, which would further risk altering the properties which it confers to the glazing.

It has been proposed in European Patent Publication No. 0,133,111 to incorporate at least a tensio-active agent into the reticulated structure of the polyurethane layer. Reticulated is used to mean a structure comprising a certain number of bridging bonds between linear or branched chains. Due to the existence of a three-dimensional system, it seems that the tensio-active agents find anchoring points in the cross-linked structure and remain there durably fixed.

The tensio-active agent penetrates the layer while retaining the known hydrophilic properties of said tensio-active agent. Due to the reserve thus available, the anti-fogging effect persists for a much longer time. Nevertheless, this effect is decreased over time and the proposed solution is therefore not completely satisfactory.

The object of the invention is therefore a fog-resistant, auto-cicatrizable, anti-lacerating, transparent polyurethane layer, which can be used in the above-described safety glazings, as well as a method of manufacture of said layer.

SUMMARY OF THE INVENTION

The layer in accordance with the invention is an aliphatic polyurethane layer with cross-link bonds and it contains monomers and/or oligomers of acrylic acid or of salts of said acrylic acid grafted radiochemically to its surface.

The presence of monomers and/or oligomers of acrylic acid or of salts of said acid at the surface of the cross-linked polyurethane layer renders said surface very hydrophilic, such that the fine droplets of condensed water which form the fog are spread over said polyurethane surface and do not alter its optical properties.

Also, the properties of the surface such as resistance to scratching and abrasion of the polyurethane are at least retained, contrary to that which is observed when an acrylic polymer is grafted onto the surface of the polyurethane. These surface properties may even be improved in the case of a polyurethane layer having both properties of absorption of energy and surface properties as described for example in European Patent Publication 0 133 090. These polyurethane layers are obtained by reactive casting of components which are essentially difunctional or comprise as the polyol component a mixture of long polyols, a chain lengthener and a polyol of functionality greater than 2.

Moreover, one of the major problems encountered in obtaining the polyurethane layer grafted with monomers or oligomers of acrylic acid or of salts of said acid is precisely to prevent the formation of an acrylic polymer, and in particular an acrylic acid homopolymer at the surface of the polyurethane, which would at least partially destroy the good surface properties of the polyurethane. The method of grafting in accordance with the invention which is described below resolves this problem.

The invention is applied in particular to heat-hardenable, transparent polyurethane layers. It can also be applied to polyurethane layers obtained by high temperature reactive pouring, on the order of 100° to 140° C., of difunctional components, with this method providing branching reactions and therefore also cross-linking. Such layers are described for example in European Patent Publication 0,133.090.

The invention is preferably applied to a transparent plastic layer formed essentially of a heat-hardenable polyurethane obtained from the reaction products of (a) difunctional aliphatic isocyanates such as 1,6-hexamethylenediisocyanate, 2,4,4-trimethyl-1,6-hexamethylenediisocyanate, 2,4-trimethyl-1,6-hexamethylenediisocyanate, 1,3-bis (isocyanatomethyl) benzene, bis (4-isocyanatocyclohexyl) methane, bis (3-methyl-4-isocyanatocyclohexyl) methane, 2,2-bis (5'-isocyanatocyclohexyl) propane and 3-isocyanatomethyl-3,5,5-trimethylcyclohexylisocyanate, as well as the biurets, isocyanurates and prepolymers of two of said compounds having a functionality of 3 or more; and (b) the polyfunctional polyols, such as the branched polyols such as polyesterpolyols and polyetherpolyols obtained by reaction of (1) polyfunctional alcohols, such as 1,2,3-propanetriol (glycerol), 2,2-bis (hydroxymethyl)-1-propanol (trimethylolethane), 2,2-bis (hydroxymethyl)-1-butanol (trimethylolpropane), 1,2,4-butanetriol, 1,2,6-hexanetriol, 2,2-bis (hydroxymethyl-1,3-propanediol (pentaerythritol) and 1,2,3,4,5,6-hexanehexol (sorbitol), with (2) aliphatic diacids such as malonic acid, succinic acid, glutaric acid, adipic acid, suberic acid and sebacic acid or with cyclic ethers, such as ethylene oxide, 1,2-propylene oxide and tetrahydrofuran, with the molecular weight of the branched polyols generally being approximately 250 to 4000 and preferably approximately 450 to 2000. Mixtures of various polyisocyanates and polyols can be used.

The invention also relates to a method for the formation of a polyurethane layer having anti-fogging properties.

In accordance with the method, acrylic acid is grafted to the surface of the polyurethane by radiochemical grafting using electron bombardment. In particular, the irradiation of the surface layer of the polyurethane causes the rupture of the polyurethane chains and the formation of radicals, part of which can thus react with the acrylic acid.

Preferably, the radiochemical method uses electron bombardment so as to limit the action of the radiation at the surface layer of the polyurethane. In effect, is has been noted that X-ray radiation which was too energetic altered the mechanical properties of the polyurethane and, in addition, caused very rapid homopolymerization of the acrylic acid.

A preferred method for the grafting consists of using a low energy electronic radiation whose penetration into the polyurethane layer is limited to approximately 100 to 150 μm.

In addition, in order to prevent too rapid a penetration of the acrylic acid during its deposit onto the polyurethane layer, an aqueous solution is preferably used whose acrylic acid content is less than 20% by weight and preferably less than 10% by weight.

The dilution of the acrylic acid in the water also has the advantage of limiting the homopolymerization reaction of the acrylic acid during the irradiation when said irradiation follows the deposit of the aqueous acrylic acid solution on the polyurethane layer.

The polyurethane layer can be irradiated in advance, then placed in the presence of the aqueous acrylic acid solution.

The aqueous acrylic acid solution is preferably first deposited onto the polyurethane layer and the layer covered in this manner is submitted to low energy radiation, preferably a low energy electronic radiation for the reasons mentioned above.

When the polyurethane layer has been irradiated and at its surface essentially comprises acrylic acid monomers and oligomers, it can undergo a subsequent treatment by the action of a base, such as soda or potash, so as to transform the acid groups into carboxylates, whose hydrophilic character is more accentuated and which consequently have a more improved anti-fogging effect.

DETAILED DESCRIPTION OF THE INVENTION

The advantages and characteristics of the invention will become apparent from the following description of anti-fogging layers in accordance with the invention.

EXAMPLE 1

The treated cross-linked polyurethane layer is the one obtained in accordance with the method described for example in French Patent Publication No. 2,398,606. It is a layer of a thickness of 0.4 mm formed for example from the following reaction mixture:

100 g of a polyetherpolyol prepared by condensation of propylene oxide with a triol, with a molecular weight of approximately 450 and a free OH radical content of 10.5 to 12%.

23 g of p-cresol di-t-butyl.

0.5 g of dibutyltin dilaurate.

1000 g of a biuret of 1-6 hexamethylenediisocyanate with a free NCO radical content of 21 to 25%.

This reaction mixture is placed onto a flat pouring support by means of a pouring head, for example the one described in French Patent Publication 2,347,170. The layer is polymerized by the action of heat. This layer is then covered with an adhesive layer of an essentially thermoplastic polyurethane. The two-layer sheet is detached from the pouring support.

The sheet is assembled with a glass support by means of the thermoplastic polyurethane layer.

An aqueous solution with 5% acrylic acid is deposited onto the external layer of polyurethane in an amount of approximately 0.5 g of solution per 100 cm$^2$ of surface to be treated.

The glazing is then subjected to electron radiation at 170 kV and 1.8 mA. The dose received is approximately 1 Mrad.

The dose is the quantity of energy transferred to the material which is expressed in units of energy per units of volume of the irradiated material (1 rad = 6.25 10$^3$ eV/g).

After irradiation, the glazing is tempered in a 1% soda solution so as to transform the acid groups into sodium carboxylates.

The glazing finally obtained has anti-fogging properties. The mechanical characteristics of the polyurethane layer are not affected.

EXAMPLE 2

A glazing is prepared in the same manner as in Example 1.

An aqueous solution with 10% acrylic acid is deposited onto the external layer of polyurethane in an amount of approximately 0.5 g of solution per 100 cm$^2$ of surface to be treated.

The glazing is then subjected to electronic radiation at 170 kV and 1.7 mA in the presence of oxygen so as to inhibit the homopolymerization reaction of the acrylic acid. The dose absorbed is 1 Mrad.

EXAMPLE 3

The method of Example 1 is repeated except that the dose absorbed is doubled by double irradiation. The anti-fogging properties are further improved.

EXAMPLE 4

A glazing is prepared in the same manner as in Example 1, except that the polyurethane layer treated is obtained in the following manner:

460 parts by weight of 1,6-hexanediol and 70 parts of trimethylolpropane are esterified with 167 parts of adipic acid, 56 parts of o-phthalic acid and 247 parts of i-phthalic acid until a free OH radical content of approximately 4.3% by weight and an acid index (DIN 53.402) of approximately 1 are obtained. The slightly branched polyesterpolyol obtained in this manner constitutes the polyol component for the reaction mixture. To the polyesterpolyol are added 0.1% by weight of a fluoroalkylated ester as a spreading agent and 1% by weight of bis (1,2,2,6,6-pentamethyl-4-piperidyl) sebacate as an agent for protection against light.

For the preparation of the reaction mixture, 100 g of an essentially trifunctional polyisocyanate, which is a biuret of 1,6-hexamethylenediisocyanate, having a free NCO radical content of 23% by weight, are heated with 216 g of the above-described polyesterpolyol to a temperature of 80° C. and are stirred at this temperature for 10 minutes. The NCO/OH equivalent ratio of the reaction mixture is thus 1.

After mixing the two components, the reaction mixture is deposited by means of a pouring head in a layer of a thickness of 0.5 mm.

EXAMPLE 5

The method of Example 1 is used except that the polyurethane layer obtained is treated in the following manner:

100 g of an essentially trifunctional polyisocyanate containing 1,6-hexamethylenediisocyanate-based isocyanurate radicals, having a free NCO radical content of 21.5% by weight, are mixed strongly for 10 minutes at 40° C. with 94.2 g of a trifunctional polycaprolactone having a content of free OH radicals of 9.3% by weight. The NCO/OH ratio is therefore 1. 0.015% by weight, in relation to the polycaprolactone, of dibutyltin dilaurate as a reaction catalyst, 0.1% by weight of a fluoroalkylated ester as a spreading agent and 1% by weight of bis (1,2,2,6,6-pentamethyl-4-piperidyl) sebacate as an agent for protection against light are added in advance as additives to the polycaprolactone. After mixing the two components, the reaction mixture is applied in a layer of a thickness of 0.5 mm using a rake.

In all the preceding examples, the glazings obtained have improved anti-fogging properties as compared to glazings provided with a polyurethane layer which is not grafted radiochemically using acrylic acid monomers or oligomers.

The mechanical characteristics of the polyurethane layer, in particular scratch and abrasion resistance, are equivalent to those of an ungrafted layer.

The following table sets forth the results obtained.

TABLE

| | Scratch Resistance | Abrasion Resistance | Angle of Contact | Fogging Test (Breath) |
|---|---|---|---|---|
| Example 1 | 0.26 N | 2.0% | 20° | almost transparent fog |
| Example 2 | 0.25 N | 2.3% | 22° | almost transparent fog |
| Example 3 | 0.24 N | 1.9% | 7° | homogeneous and transparent condensate |
| Example 4 | 0.25 N | 1.9% | 20° | almost transparent fog |
| Example 5 | 0.25 N | 1.9% | 20° | almost transparent fog |
| Comp. Ex without treatment | 0.25 N | 2.4% | 63° | almost white milky fog |

The scratch resistance of the polyurethane surface is determined in accordance with the Erichsen method which consists of turning a 10×10 cm sample under a diamond point forming a 50° angle rounded to a radius of 15 microns which is charged with increasing weights. The maximum load, expressed in Newtons, which does not cause permanent scratches, will be noted and considered as the scratch resistance.

The abrasion resistance is determined using Taber Abraser equipment in accordance with the ASTM-1044 method for abrasion and in accordance with ASTM-1003 for the measurement of light diffusion, expressed as a percentage, obtained using the surface deterioration. 100 Revolutions of the 10×10 cm sample are carried out under CS 10 F type abrasive grinders.

In order to appreciate the anti-fogging effect, or in other words the facility for wetting the surface by a homogeneous film of water, the angle of contact which results from the deposit of one drop of water on the polyurethane surface is observed. This measurement is very easy to make using a microscope with an integrated goniometer.

Finally, the good or bad functioning of an anti-fogging layer can be determined by simply breathing on the surface. The appearance of the condensate obtained can vary between very bad (white fog, milky) and excellent (perfectly transparent, homogeneous layer of humidity, therefore transparent).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transparent aliphatic polyurethane layer having cross-link bonds, which can be used in safety glazing, this layer having properties of the surface including resistance to scratching and abrasion, and having monomers and/or oligomers of acrylic acid or of salts of said acrylic acid radiochemically grafted to its surface such that the resulting layer has anti-fogging properties.

2. A laminated glazing containing a coating of the polyurethane layer in accordance with claim 1.

3. A method for manufacture of a polyurethane layer having anti-fogging properties, and having properties of the surface including resistance to scratching and abrasion, which can be employed in safety glazing, wherein acrylic acid or a salt thereof is grafted to the surface of the polyurethane by placing the polyurethane layer in the presence of the acrylic acid and grafting by irradiation of said polyurethane surface and preventing the formation of an acrylic polymer.

4. A method of making a layer of polyurethane having improved surface properties in accordance with claim 2, wherein acrylic acid is grafted onto a polyurethane surface by putting the polyurethane layer in contact with said acrylic acid and grafting by irradiation, said irradiation being by electron bombardment or photoemission.

5. The polyurethane layer formed by the process of claim 4.

6. The method in accordance with claim 3, wherein the acrylic acid is grafted by a low energy electron bombardment.

7. The method in accordance with claim 6, wherein the aqueous solution of acrylic acid is deposited onto the polyurethane layer and the layer covered in this manner is submitted to electronic bombardment.

8. The method of claim 6, wherein said polyurethane surface is first irradiated and then contacted with said acrylic acid.

9. The method in accordance with claim 3, wherein the placing of the polyurethane layer in the presence of the acrylic acid is carried out by the deposit onto the polyurethane layer of an aqueous solution whose acrylic acid content is less than 20%.

10. The method of claim 9, wherein said concentration is less than 10%.

11. The method in accordance with claim 3, wherein, after grafting the acrylic acid to the surface of the polyurethane layer, the acid groups are transformed into carboxylate groups through the action of a base.

12. The polyurethane layer formed by the process of claim 3.

* * * * *